(12) United States Patent
Midorikawa et al.

(10) Patent No.: US 7,657,979 B2
(45) Date of Patent: Feb. 9, 2010

(54) BUCKLE SWITCH AND BUCKLE DEVICE

(75) Inventors: Yukinori Midorikawa, Kanagawa-ken (JP); Ayaki Oyamada, Kanagawa-ken (JP); Toshiharu Mori, Miyagi-ken (JP)

(73) Assignees: Alps Electric Co., Ltd., Tokyo (JP); Autoliv Development AB, Vargarda (SE)

( * ) Notice: Subject to any disclaimer, the term of this patent is extended or adjusted under 35 U.S.C. 154(b) by 208 days.

(21) Appl. No.: 10/577,842

(22) PCT Filed: Oct. 26, 2004

(86) PCT No.: PCT/JP2004/015834

§ 371 (c)(1),
(2), (4) Date: May 14, 2007

(87) PCT Pub. No.: WO2005/039943

PCT Pub. Date: May 6, 2005

(65) Prior Publication Data

US 2007/0271746 A1  Nov. 29, 2007

(30) Foreign Application Priority Data

Oct. 28, 2003  (JP) ............................. 2003-366816

(51) Int. Cl.
*A44B 11/25* (2006.01)
(52) U.S. Cl. ..................................... 24/633; 340/457.1
(58) Field of Classification Search .................. None
See application file for complete search history.

(56) References Cited

U.S. PATENT DOCUMENTS

2004/0111845 A1* 6/2004 Lee et al. ....................... 24/633

FOREIGN PATENT DOCUMENTS

| JP | 2001-71865 | 3/2001 |
| JP | 2003-81057 | 3/2003 |
| JP | 2003-127830 | 5/2003 |

OTHER PUBLICATIONS

International Search Report dated Feb. 15, 2005 from corresponding PCT Application No. PCT/JP2004/015834.

* cited by examiner

*Primary Examiner*—Jack W. Lavinder
(74) *Attorney, Agent, or Firm*—Beyer Law Group LLP

(57) ABSTRACT

To provide a buckle switch and buckle device wherein a first switch section and a second switch section are unitized to provide improved assembling workability and increased production efficiency.

As a tongue plate is inserted to a buckle body to move a slider, a pressing segment 23*b* of the slider rotates a leaf spring 46 in a direction a and, hence, a depressible portion 44*c* is depressed to cause a movable member 44 to move in a direction X2. At this time, a stationary contact 71*a* moves into and is pinched by pinch members 53 of a movable contact 50 disposed on the movable member 44, rendering the switch section SW1 to assume a conductive state. Concurrently, since a magnet M2 is placed in opposition to a magnetic detecting element 61, a second switch section SW2 is switched over. By unitizing the first and second switch sections, assembling workability of a buckle switch 40 to the buckle body can be improved, enabling an increase in production efficiency.

6 Claims, 8 Drawing Sheets

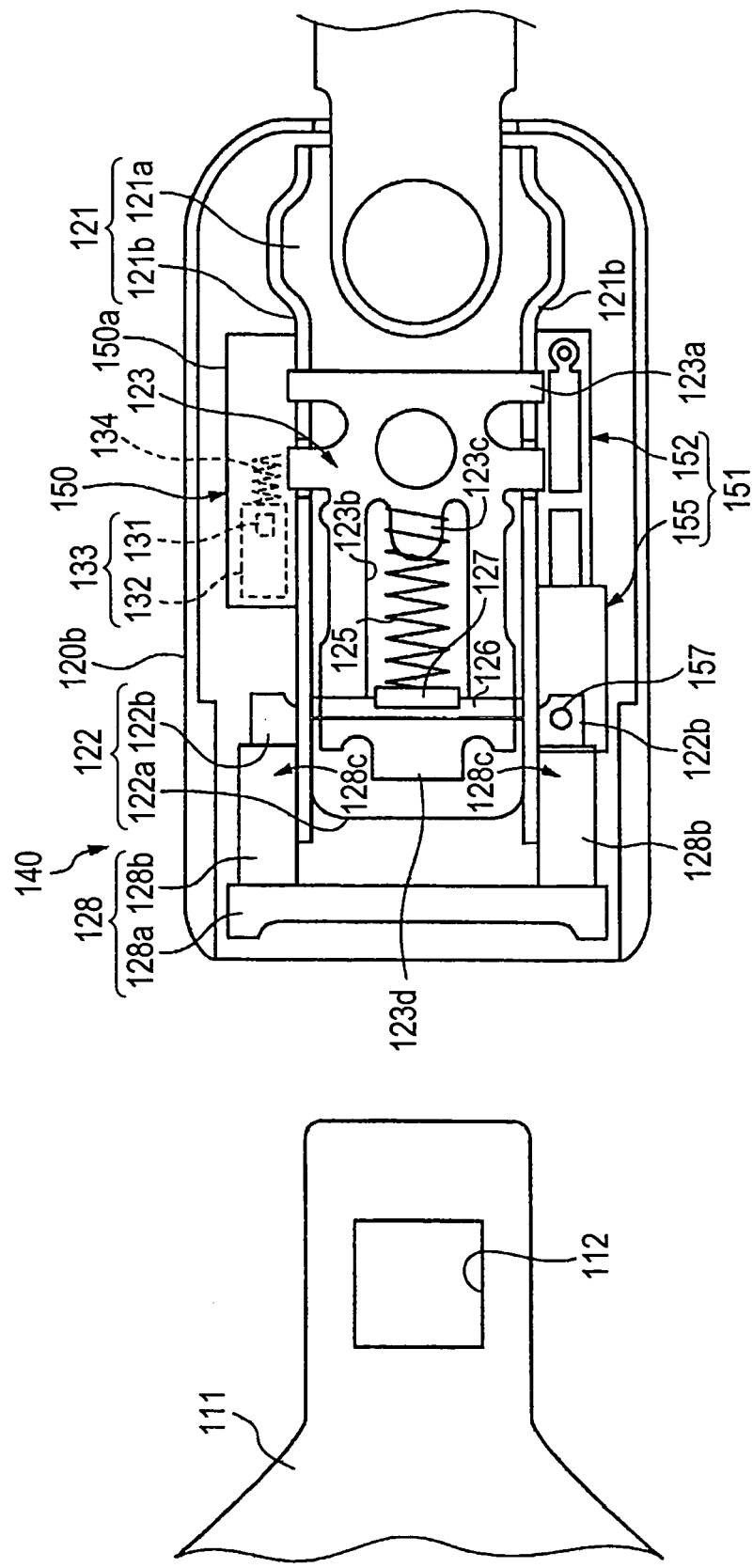

BUCKLE SWITCH AND BUCKLE DEVICE

TECHNICAL FIELD

The present invention relates to a buckle switch, monitoring whether a tongue plate disposed in a seat belt is inserted to and ejected from a buckle body, and a buckle device employing such a buckle switch and, more particularly, a buckle switch, in which a contact type first switch section and a non-contact type second switch section are unitized, and a buckle device employing such a buckle switch.

BACKGROUND ART

A variety of transportation facilities, involving automobiles, have seats equipped with seat belt devices for protecting vehicle occupants from injuries during emergencies such as collisions. In order for the seat belt device of this kind to be simply buckled or unbuckled, the seat belt device normally includes a buckle device in which in general, a latch member for latching a tongue plate is spring urged toward the tongue plate in a latch direction and a lock member allows the latch member to keep the tongue plate and the buckle body under a latched status.

By the way, with such a buckle device, a need arises for a lamp to provide a display of the presence of the tongue plate and the buckle body remaining under the latched status, for a belt winding force reduction mechanism of a retractor or the like to be controllably operated, or for buckling and unbuckling information of the seat belt to be transmitted to an air bag ECU (electronic Control Unit). To this end, the buckle body internally has a buckle switch for detecting the latched status.

A prior art related to the buckle switch of this kind includes, for instance, a Patent Literature 1 described below.

FIG. 8 is an illustrative view related to a buckle device disclosed in the Patent Literature 1.

With a structure shown in FIG. 8, as a tongue plate 111 is inserted from a non-latched status into a buckle body 140, a distal end 123d of a latch member 123, disposed inside the buckle body 140, is latched to a latch hole 112 formed in a distal end of the tongue plate 111.

Disposed inside the buckle body 140 are a first switch section 133, composed of a hall element 131 and a permanent magnet 132, and a second switch section 151 operative to perform switchover between an NC (Normally Closed) contact and an NO (Normally Open) contact. With the first switch section 133, a first section of the magnet 132 is placed in face-to-face relationship with the hall element 131 during a non-latched status and a second section of the magnet 132 is placed in face-to-face relationship with the hall element 131 during a latched status, thereby making it possible to detect whether the tongue plate 111 and the buckle body 140 remains under the latched status or non-latched status.

An unbelted warning lamp (not shown) is connected to the NC contact of the second switch section 151 and an electromagnetic solenoid (not shown) of a winding force reduction mechanism is connected to the NO contact. For instance, as an occupant starts up an automobile, an ignition switch IG is turned on at which time under the non-latched status, the unbelted warning lamp is lighted up and upon the occurrence of the latched status, the electromagnetic solenoid is energized to render the winding force reduction mechanism operative for thereby alleviating a clamping force of a webbing by which the occupant is restrained. Further, the ECU detects the magnitude of electric current flowing through the hall element 131 of the first switch section 133 and if the tongue plate 111 and the buckle body 140 remain under the latched state, then, an airbag is rendered operative or the magnitude of an airbag output can be altered.

Patent Literature 1: Japanese Patent Application Laid-Open Publication No. 2003-81057

DISCLOSURE OF INVENTION

Problems to be Solved by the Invention

However, the buckle switch, disclosed in the above Patent Literature 1, takes the form of a structure wherein as shown in FIG. 8, the first switch section 133 and the second switch section 151 are separately and independently disposed on both sides of a centrally located base 121 such that the same is sandwiched.

Therefore, during assembling work, the first switch section 133 and the second switch section 151 need to be separately accommodated in the buckle body 140 in a layout condition mentioned above and issues arise in the occurrence of complicated assembling work with deterioration in production efficiency while the number of component parts increases with the resultant difficulty in reduction of manufacturing costs.

Further, the buckle switch, disclosed in the above Patent Literature 1, takes the form of a structure wherein the magnet 132 and the slider 155 are located on both sides of the base 121, respectively, and an issue arises wherein a time difference (time lag) is liable to occur between a timing at which the ejector 122 moves the magnet 132 and a timing at which the slider 155 is caused to move.

The present invention has been made with a view to addressing the issues encountered in the prior art mentioned above and has an object to provide a buckle switch and a buckle device that can reduce the number of component parts of the buckle device to improve assembling workability with an increase in production efficiency.

Means for Solving the Problems

The present invention provides a buckle switch for detecting a buckling and unbuckling status between a tongue plate, attached to a seat belt, and a buckle body to and from which the tongue plate is buckled and unbuckled, comprising:

a case, a movable member freely movable within the case, an urging member for urging the movable member in a direction to be apart from the case, a first switch section including a movable contact disposed on the movable member and a stationary contact disposed in a position opposite to the movable contact inside the case, and a second switch section including a magnet and magnetic detection means one of which is disposed on the movable member and the other disposed in the case;

the buckle body having an inside including a slider movable with the tongue plate when the tongue plate is inserted to the buckle body wherein the movable member is caused to move in a direction against the urging member due to movement of the slider to render the movable contact and the stationary contact of the first switch section conductive to switch an output state of the magnetic detection means of the second switch section.

With the present invention, since the buckle switch internally has the first switch section and the second switch section integrally unitize in structure, the number of component parts to be accommodated in the buckle body can be reduced.

Further, since the contact type first switch section and the non-contact type second switch section are accommodated inside the case in a unitized configuration, assembling the component parts to the inside of the buckle device can be favorably achieved, enabling an increase in productivity.

Furthermore, due to an ability of operatively depressing the movable member to cause the first switch section and the second switch section to be concurrently driven, the first switch section and the second switch section can be operated in synchronism with high reliability.

In the above, the one of the stationary contact and the movable contact may preferably include a pair of pin-shaped terminals and the other may preferably include pinch members for pinching the pin-shaped terminals in sliding capabilities wherein in this case, one pin-shaped terminal and the other pin-shaped terminal are formed in different lengths in dimension and the pin-shaped terminal with a short length in dimension is operative to be brought into or out of pinching engagement with the pinch members.

With the means mentioned above, the switch can be turned on or turned off only between the pin-shaped terminal with the short length and the pinch members and smooth operation can be achieved with less sliding friction. This enables reduction in the occurrence of chattering.

Further, the urging member may be preferably disposed between the first switch section and the second switch section.

With the means described above, since the movable member can be moved in an increased balance, the buckle switch can have an extended life time and the first switch section and the second switch section can be operated in synchronism for a long period of time.

For example, the magnetic detection means may internally incorporate a hall element as a magnetic detecting element.

ADVANTAGES

With the present invention, the first switch section SW1 and the second switch section SW2 are unitized, improving assembling workability of these component parts with respect to the buckle body with the resultant increase in production efficiency.

Further, switchover of the first switch section SW1 and switchover of the second switch section SW2 can be performed in synchronism, enabling a reduction in a time difference (time lag) occurring during the switchover operations of both the switch sections.

BEST MODE FOR CARRYING OUT THE INVENTION

FIG. 1 is an exploded perspective view showing an embodiment of a buckle device, FIG. 2 shows a schematic cross-sectional view taken on line 2-2 of FIG. 1 with A representing an initial status prior to the insertion of a tongue plate while B represents a latched status in which the tongue plate remains inserted, FIG. 3 show schematic cross-sectional views taken on line 3-3 of FIGS. 2A, B with A representing the initial status while B represents the latched status, FIG. 4 shows a buckle switch mounted in the buckle device as the embodiment according to the present invention with A representing a cross-sectional view for an initial status while B represents a cross-sectional view for a latched status, FIG. 5 is a cross sectional view taken on line a-b-c-d-e-f of FIG. 4 with E representing an initial status while B represents a latched status, and FIG. 6 is a perspective view showing a movable contact in the embodiment according to the present invention.

A buckle device 10 shown in FIG. 1 is comprised mainly of a buckle body 11 including an upper cover 12 and a lower cover 13, and a tongue plate 14 retained with the buckle body 11.

The buckle body 11 internally has a frame 21, formed in a U-shape in cross-section, which includes sidewalls 21A, 21B and a bottom wall 21C. A latch member 22 is disposed inside the frame 21. The latch member 22 has one end (an end portion on a side facing a direction Y1) formed with support arms 22a, 22b, protruding in directions X1 and X2, which are swingablly supported in support apertures 21a, 21b formed in the sidewalls 21A, 21B mentioned above. The latch member 22 has a central area formed with an opening 22c that has an edge portion formed with an engagement protrusion 22d that protrudes in a direction Y2. Also, the latch member 22 has the other distal end (an end facing the direction Y2) formed with a latch segment 22e that protrudes in a convex form in a direction Z2.

A slider 23 is disposed beneath the frame 21 and is freely movable in a direction Y1-Y2 representing a buckling and unbuckling direction. The slider 23 has a pressing segment 23b, extending from a central area of a base portion 23a in the direction Y1, and arm segments 23c, 23d, extending from the base portion 23a to both ends thereof, providing a substantially W-shaped configuration on a plane as shown in FIGS. 3A, 3B. Formed between a distal end of the pressing segment 23b and the base portion 23a is a support segment 23e that protrudes in the direction X1 while extend in the direction X. The support segment 23e of the slider 23 is inserted through a guide aperture 21c (see FIGS. 2A, B), formed in the bottom portion 21C of the frame 21, to be guided and supported for movements in the buckling and unbuckling direction.

As shown in FIG. 1, an ejector 24 is disposed between the latch member 22 and the bottom portion 21C of the frame 21. The ejector 24 has a base portion 24a formed in a U-shape configuration and arm segments 24b, 24c that extend from both distal ends of the base portion 24a in both side directions (in two directions X1 and X2). Further, the base portion 24a has a surface, facing the direction Y2, formed with a depressible portion 24d.

The arm segments 24b, 24c extend through elongated slots 24d, 24e, formed between both sidewalls 21A, 21B of the frame 21 and the bottom wall 21C, respectively, and have distal ends that extend to the outside of the frame 21. The distal ends of the arm segments 24b, 24c are fixedly secured to the distal ends of the arm segments 23c, 23d of the slider 23 at outer areas of the frame 21 by means of rivets or the like. That is, the ejector 24 can be moved in one with the slider 23 in the buckling and unbuckling direction.

A cantilever 25, having a distal end formed with a curved engagement portion 25a and a base portion formed with shaft portions 25b, is pivotally supported with the U-shaped base portion 24a of the ejector 24. Also, the engagement portion 25a has a surface on which a latch protrusion 25a1 is formed.

Further, the cantilever 25 has a front surface formed with a spring retainer protrusion 25c and an urging member S1 such as a coil spring is disposed between the spring retainer protrusion 25c and the engagement protrusion 22d of the latch member 22 under a compressed status. Thus, an urging force is applied to between the spring retainer protrusion 25c and the engagement protrusion 22d in a direction to separate these component parts away from each other. The urging member S1 urges the engagement portion 25a formed at the distal end of the cantilever 25 in a counterclockwise direction, as shown, at all times.

As shown in FIG. 1, the both sidewalls 21A, 21B of the frame 21 have cutout portions 21f, 21f, formed at areas facing the direction Y2, which have elongated recesses extending in the direction Y and concave recesses plunging in the direction Z1. Inserted to the concave recesses of the cutout portions 21f, 21f are pivot shafts 26c by which a stopper 26 is swingablly supported. The stopper 26 has a lower end, facing the direction Z2 and formed with an actuating shaft 26a that extends in the directions X1 and X2, and a distal end, facing the direction Y1, which is integrally formed with latch segments 26b, 26b. Also, the latch segments 26b, 26b are disposed in a movement locus of a lock bar 27 that will be described below.

The both sidewalls 21A, 21B of the frame 21 have substantially L-shaped guide bores 21g, 21g formed in symmetric positions. As shown in FIGS. 2A, B, the lock bar 27 is held in engagement with the engaging portion 25a of the cantilever 25 and retained with the engagement segments 26b, 26b of the stopper 26.

A release button 28 is located on the frame 21 at the end facing the direction Y2 to be freely movable in a buckling and unbuckling direction. The release button 28 has an actuator portion 28a, exposed to the outside through an opening 12A formed on the upper cover 12 at one end thereof facing the direction Y2, and leg portions 28b, 28b extending from the actuator portion 28a in the direction Y1. The leg portions 28b, 28b have distal ends formed with actuating concave portions 28d, 28d that accommodate therein both ends of the lock bar 27 extending from the guide bores 21g, 21g to the outside.

Both inner walls of the leg portions 28b, 28b are formed with guide protrusions 28e, 28e, respectively, which protrude inward and extend in the direction Y. The guide protrusions 28e, 28e are inserted to the elongated recesses of the cutout portions 21f, 21f, formed in the frame 21, respectively. When the release button 28 moves in the directions Y1 and Y2, the guide protrusions 28e, 28e are guided by the elongated recesses of the cutout portions 21f, 21f, respectively. Therefore, the release button 28 is rendered operative to move in a direction parallel to the bottom wall 21C of the frame 21.

The release button 28 is formed with a lower end portion 28f that extends from the actuator portion 28a at a surface facing the direction Y. The lower end portion 28f is formed with a bearing recess 28c, extending in the direction X, to which the actuating shaft 26a of the stopper 26 is rotatably inserted. Accordingly, when the actuator portion 28a of the release button 28 is operatively depressed in the direction Y1, the bearing recess 28c presses the actuating shaft 26c in the direction Y1 and, hence, the stopper 26 is made rotatable in the counterclockwise direction. Likewise, when the release button 28 is moved in the direction Y2, the stopper 26 is rendered rotatable in the clockwise direction.

Also, a gap G is defined between the lower end portion 28f of the release button 28 and the bottom wall 21C of the frame 21 for making it possible to insert a distal end of the tongue plate 14 (see FIG. 2A). Moreover, one distal end of an anchor plate 30, inserted through an inserter section 12B of the bulk body 11, is caulked and fixedly connected to the frame 21 at one end facing the direction Y1. The other distal end of the anchor plate 30 is coupled to a vehicle body frame on a side of an occupant seat.

As shown in FIG. 1, the bottom wall 21C of the frame 21 has a lower surface on which a buckle switch 40 is mounted.

As shown in FIGS. 4A, B, the buckle switch 40 takes the form of a switch body including an outer sheath 41 made of synthetic resin. Internally disposed in the outer sheath 41 is an internal case 42 by which a switch chamber 40A facing the direction X1 and a switch chamber 40B facing the direction X2 are divided.

The outer case 41 has an upper portion 41A, facing the direction X1, which is formed with a through-bore 41a. The switch chamber 40A internally has a movable member 44, playing a role as an actuator composed of a base portion 44a and a hollow portion (sleeve portion) 44b integrally formed to be perpendicular to the base portion 44a. The hollow portion 44b has a distal end, facing the X1 direction, which serves as a depressible portion 44c and the depressible portion 44c is caused to protrude outside the outer sheath 41 via the through-bore 41a.

In the switch chamber 40A, the inner case 42 has a bottom portion 42A formed with a guide shaft 43 extending in the direction X1 and the guide shaft 43 has a distal end facing the direction X1, which is placed in face-to-face relationship with the through-bore 41a.

The guide shaft 43 is inserted to the hollow portion 44b of the movable member 44 and the movable member 44 is guide by the guide shaft 43 and supported for protruding and retracting capabilities in the directions X1 and X2. An urging member S3, composed of a coil spring, is disposed on outer peripheries of the guide shaft 43 and the hollow portion 44b in an area between a lower end of the base portion 44a and the bottom portion 42A of the inner case 42 such that the movable member 44 is urged in the direction X1 at all times. Accordingly, under a normal condition, the depressible portion 44c of the movable member 44 remains protruding to the outside of the outer sheath 41.

A waterproof member 45 is disposed between an inner surface of the upper portion 41A of the outer sheath 41 and the base portion 44a of the movable member 44 so as to cover a surface of the base portion 44a and the outer periphery of the hollow portion 44b. The waterproof member 45 is made of a member such as silicone rubber having elasticity and held in close contact with a step formed on a lower portion of the depressible member 44c in an annular configuration. The waterproof member 45 serves to prevent water droplets from entering an interior of the outer case 41 via the through-bore 41a.

As shown in FIGS. 4A, B and 6, the base portion 44a of the movable member 44 has a lower surface, at an area facing the direction Y2 with respect to the hollow portion 44b, carries a movable contact 50 that plays a role as a part of a first switch SW1.

Punching and press forming a conductive thin metallic plate such as, for instance, phosphor bronze and bending the resultant press formed component part into a roof-shaped configuration (a reversed V-shape) forms the movable contact 50. The metallic plate has a central area formed with an opening 52 whose periphery is surrounded by a base portion 51. The base portion 5a has both edge portions, facing the directions Z1 and Z2, which are formed with contact segments 53a, 53b, 54a, 54b that protrude so as to extends inward the opening 52. The contact segments 53a, 53b, 54a, 54b have distal ends integrally formed with contact portions 53a1, 53b1, 54a1, 54b1 that protrude in shapes formed in circular arc shapes or convex shapes, respectively. The contact segment 53a and the contact segment 53b are bent in directions to come close to each other such that the contact portions 53a1 and the contact portion 53b1 are brought into abutting engagement with each other while one of the contact portions resiliently urges the other contact portion. Likewise, the contact segment 54a and the contact segment 54b are bent in directions to come close to each other such that the contact portions 54a1 and the contact portion 54b1 are brought into abutting engagement with each other while one of the contact portions resiliently urges the other contact portion.

That is, the contact portion 53a1 and the contact portion 53b1, mutually facing each other, form one set of pinching members 53 and, similarly, the contact portion 54a1 and the contact portion 54b1, mutually facing each other, form one set of pinching members 54.

Further, as shown in FIGS. 4A, B and 5A, B, the base portion 44a of the movable member 44 has a lower portion, in an area facing the direction Y1 with respect to the hollow portion 44b, which incorporates a second switch section SW2.

The second switch section SW2 is comprised of magnets M1, M2, juxtaposed in the direction X on a mount portion 44d extending from the base portion 44a of the movable member 44 in the direction X2, and a magnetic detector means 60 fixedly secured onto the inner case 42.

As shown in FIGS. 5A, B, the magnet M1 has a surface, facing the direction Z1, which is magnetized in an N-pole (accordingly, with a surface facing the direction Z2 magnetized in an S-pole) and the magnet M2 is fixedly secured under a status with a surface, facing the direction Z1, which is magnetized in an S-pole (accordingly, with a surface facing the direction Z2 magnetized in an N-pole) in contrast to the magnet M1.

The magnetic detector means 60, shown in the present embodiment, takes the form of a chip incorporating a hall element playing a role as a magnetic detector element 61, by which a magnetic quantity is converted to a voltage, and an operational amplifier (voltage amplifier), which is not shown, and a comparator (comparing unit) or the like. The magnetic detector 61 has a function in which operation is executed to make comparison between the voltage, corresponding to the magnetic quantity output from the magnetic detector element 61, and a reference value to generate an H-level signal when the voltage is higher than the reference value while generating a L-level signal when the voltage is lower than the reference value. That is, the magnetic detector means 60 forms the second switch section SW2.

As shown in FIGS. 4A, B and 5A, B, the magnet M1 or the magnet M2 are disposed in face-to-face relationship to a front of the magnetic detecting element 61. And, under an initial status (under a non-latched state) of the buckle device 10, the magnet M1, placed on a side facing the direction X2, is disposed in opposition to the magnetic detecting element 61 (see FIG. 5A) and, under a latched status, the magnet M2, placed on a side facing the direction X1, is disposed in opposition to the magnetic detecting element 61 (see FIG. 5B).

As shown in FIGS. 4A, B, the switch chamber 40B of the outer sheath 41 has connecting terminals 71, 72, 73, 74, 75 and 76. The connecting terminals 71, 72, 73 and 74 are made of relatively hard conductive material, such as brass, and fixedly secured to the bottom portion 42A of the inner case 42.

The connecting terminals 71, 72 have one ends (facing the direction X1) that are formed in a pair of linearly extending pin-shaped terminals whose distal ends serve as stationary contacts 71a, 72a. The stationary contacts 71a, 72a are guided into the switch chamber 40A via a through-aperture formed in the bottom portion 42A of the inner case 42. The stationary contact 71a of the connecting terminal 71 has a lengthwise dimension shorter than a lengthwise dimension of the stationary contact 72a of the connecting terminal 72.

Therefore, under the initial status shown in FIG. 4A, the stationary contact 71a, which is the distal end of the one connecting terminal 71, is placed in opposition at an area remote from the contact portions 53a1 and the contact portion 53b1 of the movable contact 50 forming the pinching members 53 (under a non-conductive state). On the contrary, the stationary contact 72a, which is the distal end of the other connecting terminal 72, is pinched between the contact portions 54a1 and the contact portion 54b1 forming the pinching members 54 (under a non-conductive state).

And, if a latch status appears as shown in FIG. 4B, the stationary contact 71a, which is the distal end of the one connecting terminal 71, penetrates into between the contact portion 53a1 and the contact portion 53b1 of the movable contact 50, forming the pinch members 53, and pinched with the pinch members 53 and, hence, the connecting terminal 71 and the movable contact 50 are connected (into a conductive state). At this time, the stationary contact 72a of the other connecting terminal 72 slides under a sandwiched status between the contact portions 54a1 and the contact portion 54b1 of the pinch members 54.

That is, the stationary contact 72a of the connecting terminal 72, longer in lengthwise dimension, and the movable contact 50 are kept under the conductive status at all times and, on the contrary, the stationary contact 71a of the connecting terminal 71, shorter in lengthwise dimension, is rendered connectable to the movable contact 50. And, the stationary contact 71a of the connecting terminal 72, shorter in lengthwise dimension, and the movable contact 50 remain in a non-conductive state during the initial condition and are brought into a conductive status when the latch state appears. Thus, the first switch section SW1 is configured such that the connecting terminal 71 and the connecting terminal 72 assume the con-conductive status during the initial condition and the conductive status during the latched condition.

Moreover, the connecting terminals 71, 72 have the other ends (facing the direction X2) formed with land portions 71b, 72b, to which lead wires 81, 82, extracted from an outer circuitry, are connected by soldering.

The connecting terminals 73, 74, playing roles as terminals for supply of electric power, apply electric power, supplied from an outside through the lead wires 83, 84, to between a power supply input terminal of the magnetic detecting element 60 and GND terminal. The magnetic detecting element 60 has output terminals connected to the connecting terminals 75, 76 located on the bottom portion 42A of the inner case 42 to allow the H-level signal or the L-level signal, output from the magnetic detecting element 60 via the connecting terminals 75, 76, to be output to the outside of the buckle device 40. Also, the connecting terminal 74 and the connecting terminal 76 are electrically connected and both play roles as common ground electrodes.

Further, disposed between the connecting terminal 73 and the connecting terminal 74 is a capacitor C that is connected to the power input terminals of the magnetic detecting element 60 in parallel thereto. The capacitor C precludes the occurrence of erroneous operation resulting from a noise signal, such as static electricity, mixed to the magnetic detecting element 60.

The upper portion 41A of the buckle device 40 has an end portion, facing the direction Y2, to which a leaf spring 46 is fixedly secured and a distal end of the leaf spring 46 is placed in opposition to the depressible portion 44c of the movable member 44. As shown in FIGS. 3A, B, the buckle switch 40 is fixedly secured to a lower surface of the bottom portion 21C of the frame 21 such that the leaf spring 46 assumes a position within a traveling locus of the pressing segment 25 that travels on the lower surface of the bottom portion 21C.

FIG. 7 is a view showing one example of a circuit configured using a buckle switch mounted on the buckle device.

As shown in FIG. 7, the connecting terminal 71 of the first switch section SW1, forming the buckle switch 40, is connected to one end of an electromagnet solenoid SL of, for instance, a belt winding force reduction mechanism via a lead wire 81. The electromagnetic solenoid SL has the other end connected to a "+" electrode of a battery E via an ignition switch IG and a fuse Fu. Moreover, the connecting terminal 72 is connected to a "−" terminal of the battery E via the lead wire 82.

Further, the connecting germinal 73 of the second switch section SW2 is connected to the ignition switch IG via a lead wire 83 and also connected to the "+" terminal of the battery E via the fuse Fu. The connecting terminal 76 is connected to the "−" terminal of the battery E via a lead wire 84. And, the connecting terminals 75, 76 are connected to an ECU for an electronic control unit of, for instance, an airbag system.

Now, the operation of the buckle switch mounted on the buckle device is described.

(1) Under Initial State (Non-latched State)

Description is made of an initial state with reference to FIGS. 2A, 3A, 4A and 5A wherein the tongue plate 14 is not buckled to the buckle device 11.

Under the initial state, as shown in FIG. 2A, the release button 28 remains in a slightly shifted position within the buckle body 11 in the direction Y1 as compared to a status shown in FIG. 2B and both the slider 23 and the ejector 24 are located in a shifted position in the direction Y2 closer to the opening 12A by the action of an urging force exerted by the urging member S1. Further, the cantilever 25 remains at an angle oriented in the clockwise direction, as shown in the drawing figure, about the center of the shaft portions 25b to cause the stopper 26 to be rotated counterclockwise, as viewed in the drawing figure, about the center of the pivot shafts 26c depending on the position of the release button 28 in the direction Y2. When this takes place, the lock bar 28 moves to upper distal ends of the guide bores 21g, 21g in respective vertical directions and remains under a condition wherein the lock bar 27 is not clamped by the latch segments 26b, 26b.

However, the cantilever 25 remains under a rotated status in a clockwise direction to cause a height position of the spring retainer protrusion 25c to be located in an area below a height position of the engagement protrusion 22d on a side facing the direction Z2, whereby upon receipt of a horizontal component (a component in the direction Y) of the urging force of the urging member S1, the engagement portion 25a of the cantilever 25 is brought into pressured contact with the lock bar 27 in the direction Y2. Therefore, the both ends of the lock bar 27 are pressed against the edges, facing the direction Y2, of the upper distal ends of the guide bores 21g, 21g in the vertical direction.

Further, the latch member 22 is rotated in the clockwise direction, as shown, due to a vertical component (a component in the direction Z1) of the urging force of the urging member S1 that remains under a compressed status. Accordingly, the latch segment 22e of the latch member 22 is set to the non-latched status remote from the bottom portion 21C of the frame 21 in the direction Z1.

As shown in FIG. 3A, since the slider 23 is moved in the direction Y2 under the initial status (non-latched status), the pressing segment 23b, disposed on the distal end of the slider 23 remains under a status remote from the leaf spring 46 of the buckle switch 40.

When this takes place, the leaf spring 46 is remote from the depressible portion 44c as shown in FIG. 4A. Consequently, the movable member 44 is moved in the direction X1 with the urging force of the urging member S2 to allow the first switch section SW1 to remain under the non-conductive state in which the connecting terminal 71 and the movable contact 50 are separate from each other. Therefore, with the structure shown in FIG. 7, since the electromagnet solenoid is rendered inoperative, the belt winding force reduction mechanism is set to an inoperative condition.

As shown in FIG. 5A, further, with the second switch section SW2, since the N-pole of the magnet M1 is placed in opposition to the magnetic detecting element 61, the magnetic detecting element 60 outputs the L-level signal that is applied to the ECU. Consequently, the ECU is set to a lighting condition, for instance, a unbelted warning lamp and an airbag device can be appropriately rendered operative in compliance with other information (such as, for instance, seat occupant information).

(2) Operation For Latched Condition

Now, description is made of a latched status with reference to FIGS. 2B, 3B, 4B and 5B wherein the tongue plate 14 is buckled to the buckle body 1.

As the distal end of the tongue plate 14 is inserted to the gap G between the lower end portion 28f of the release button 28 for the buckle body 11 and the bottom portion 21C of the frame 21 as shown in FIG. 2B, the distal end of the tongue plate 14 is brought into abutting engagement with the depressible portion 24d of the ejector 24 while causing the ejector 24 and the slider 23 to move in the direction Y1 representing a buckling direction. When this takes place, although the shaft portions 25b of the cantilever 25 is moved with the ejector 24 in the buckling direction against the urging force of the urging member S1, the engagement portion 25a of the cantilever 25 is held in pressured contact with the lock bar 27 in the direction Y2 and, hence, the cantilever 25 is caused to rotate about the lock bar 27 in the counterclockwise direction.

As the lock bar 27 rotates in the counterclockwise direction, the spring retainer protrusion 25c is moved in the direction Z1 such that a height position of the spring retainer protrusion 25c is set to the same height position as that of the engagement protrusion 22d of the latch member 22. At this time, since the urging member S1 is compressed in deformation and curved in deformation to form a convex portion in the direction Z1 (see FIG. 2B), a vertical component of the urging force of the urging member S1 acts in the direction Z2. Therefore, the cantilever 25 is caused to further rotate in the counterclockwise direction due to the component of the urging member S1 acting in the direction Z2.

As the cantilever 25 further rotates in the counterclockwise direction, the engagement portion 25a of the cantilever 25 presses the lock bar 27 downward under an engaging state in the direction Z2. When this takes place, since the lock bar 27 vertically moves along the edges, facing the direction Y2, of the guide bores 21g, 21g toward corner portions in the direction Z2 while pressing the latch member 22 in the direction Z2, the latch member 22 is caused to rotate in the counterclockwise direction about the support arms 22a, 22b. At this time, the latch segment 22e at the distal end of the latch member 22 is inserted to a latch hole 14a formed in the tongue plate 14 and penetrates into the guide aperture 21c formed in the bottom portion 21C of the frame 21, thereby causing the tongue plate 14 to be latched by the latch member 22 (under a latched state).

As the latch member 22 latches the tongue plate 14, a further buckling movement of the tongue plate 14 in the direction Y1 is stopped. However, since a horizontal component of the urging force of the urging member S1 acts on the cantilever 25 in the direction Y2, the ejector 24, carrying thereon the cantilever 24, and the slider 23 are caused to slightly move in the direction Y2. This is due to the fact that the lock bar 27 is caused to horizontally move to allow the both end portions of the lock bar 27, held in engagement with the latch protrusion 25a1 of the engagement portion 25a, to move from the corner portions of the guide bores 21g, 21g to the retainer portions 21g1, 21g1.

When this takes place, as the lock bar 27 is caused to move in the direction Y2, the associated both ends press the actuating concave portions 28d, 28d of the release button 28 in the direction Y2 and, hence, the release button 28 is slightly pushed back from the position shown in FIG. 2A to the position shown in FIG. 2B. This enables the stopper 26 to rotate in the clockwise direction about the actuating shaft 26a and, therefore, the latch segments 26b, 26b of the stopper 26 press hold the lock bar 27 into a locked condition to preclude the lock bar 27 from returning to an original condition. Accordingly, no probability occurs for the latch member 22, which has been pressed by the lock bar 27 in the direction Z2, from easily rotating in the clockwise direction, making it possible for the latch member 22 to firmly lock the tongue plate 14.

As shown in FIG. 3B, the slider 23 is caused to move in the direction Y1 under the latched state and the pressing segment 23b, formed at the distal end of the slider 23, presses the leaf spring 46 of the buckle switch 40. Therefore, the leaf spring 46 is caused to flex and deform in the direction α, thereby pressing the depressible portion 44c of the movable member 44 disposed in the buckle switch 40.

Accordingly, as shown in FIG. 4B, since the movable member 44 is caused to move in the direction X2 within the switch chamber 40A against the urging force of the urging member S2, the connecting terminal 71 of the first switch SW1 and the movable contact 50 are set to a conductive status. Accordingly, with the structure shown in FIG. 7, the electromagnetic solenoid SL is set to an energizing state and the belt winding force reduction mechanism is set to assume an operative state for enabling a seat belt to be adjusted.

Concurrently, as shown in FIG. 5B, since the second switch SW2 is set to cause the S-pole of the magnet M2 to face the magnetic detecting element 61, an output of the magnetic detection means 60 is changed over, thereby outputting an H-level signal to the ECU. Accordingly, the ECU can be set to cause a belt alarm lamp of a vehicle compartment to fall in a distinguishing status and cause an airbag device to enter an appropriate operative condition.

(3) Operation to Release Latched Status

As the release button 28 is operatively pressed in the direction Y1, since the bearing recess 28c of the release button 28 presses the actuating shaft 26a in the direction Y1 and the stopper 26 is caused to rotate in the counterclockwise direction in FIG. 2B. This allows the latch segments 26b, 26b to release the lock bar 27 from the latched state.

At the same time, since the actuating concave portions 28d, 28d of the release button 28 press the both ends of the lock bar 27 in the direction Y1, the lock bar 27 is caused to horizontally move through the guide bores 21g, 21g in the direction Y1. When this takes place, the lock bar 27 pushes the latch protrusion 25a1 of the cantilever 25 in the direction Y1, thereby moving the slider 23 and the ejector 24 in the direction Y1 to compress the urging member S1.

Moreover, as the release button 28 is further pushed and the lock bar 27 passes across the corners of the guide bores 21g, 21g in the direction Y1, the cantilever 25 is caused to immediately rotate in the clockwise direction. With such rotational movement, the lock bar 27 is lifted up by the latch protrusion 25a1 of the cantilever 25 to move along the guide bores 21g, 21g to an upper end portion in a vertical direction.

Concurrently, the height position of the spring retainer protrusion 25c of the cantilever 25 is set to a position below the height position of the engagement protrusion 22d of the latch member 22. Therefore, the latch member 22 is caused to rotate in the clockwise direction due to a vertical component (a component acting in the direction Z1) of the urging force of the urging member S1 remaining under the compressed status. Accordingly, the latch segment 22e of the latch member 22 moves away from the latch hole 14a, formed in the tongue plate 14, and the guide aperture 21c of the frame 21 (into a non-latched status), thereby restoring the initial status wherein the latch member 22 releases the tongue plate 14 from the latched status.

Further, as the cantilever 25 immediately rotates in the clockwise direction, the ejector 24 and the slider 23 are pushed out with a rushing momentum in the direction Y2. When this takes place, the depressive portion 24d of the ejector 24 pushes the distal end of the tongue plate 14 at a dash in the direction Y2, causing the tongue plate to be discharged out of the opening 12A with a rushing momentum.

As the slider 23 moves in the direction Y2 and assumes the status shown in FIG. 3A, the buckle switch 40 is also restored to the initial status shown in FIGS. 4A and 5A, upon which the first switch SW1 is returned to the non-conductive state under which the connecting terminal 71 and the movable contact 50 are separate from each other. Also, the second switch SW2 is restored to the status under which the magnetic detection means 60 outputs the L-level signal.

With the present invention, no need arises for the first switch SW1 and the second switch SW2 to be independently assembled to the inside of the buckle body 11. That is, since the first switch SW1 and the second switch SW2 are integrated within the interior of the buckle switch 40, assembling the buckle switch 40 at one time enables the first switch SW1 and the second switch SW2 to be assembled at the same time, resulting in improved assembling workability with an increase in production efficiency.

Further, accommodating the first switch SW1 and the second switch SW2 in the buckle switch 40 enables the provision of a compact structure, making it possible to achieve the miniaturization of a buckle body.

Furthermore, by synchronizing the switchover operation of the first switch SW1 and the switchover operation of the second switch SW2, that is, a time difference occurring between the switchover operations of both the switch sections can be zeroed (with no time lag) or can be minimized.

Moreover, while the first switch section SW1 represented in the present embodiment has been shown with reference to the structure wherein the movable contact 50 and the stationary contact 71a are set to the connected condition (conductive condition) or the disconnected condition (non-conductive condition) depending on movement of the movable member 44, the present invention is not limited to such a structure and an alternative may take the form of a structure wherein the movable contact 50 and the stationary contact 72a are set to a connected condition (conductive condition) or a disconnected condition (non-conductive condition).

Besides, while the present embodiment has been described with reference to a structure wherein the pin-shaped terminals are provided in the inner case 42 as the stationary contacts 71a, 72a and the pinch members 53, 54 are provided in the movable member 44 as the movable contact 50, the present invention is not limited to such a structure and may take the form of a structure wherein the movable member 44 is comprised of movable contacts including pin-shaped terminals with different lengthwise dimensions and the inner case 42 incorporates the pinch members 53, 54, like those described above, as stationary contacts.

In addition, while the second switch section SW2 has been described with reference to a structure wherein the movable member 44 includes the magnets M1, M2, the present invention is not limited to such a structure and may take the form of a structure wherein the magnetic detection means 60 is incorporated in the movable member 44 and the magnets M1, M2 are disposed in the inner case 42.

Also, while the present embodiment has been described above with reference to the magnetic detection means (magnetic detecting element) that is comprised of the hall element having the three terminals including the power input terminal, the GND terminal and the output terminal, the present invention is not limited to such a structure and may employ a hall element or other magnetic detecting element with two terminals composed of terminals common to a power input terminal and an output terminal.

BRIEF DESCRIPTION OF THE DRAWINGS

FIG. 8 is an illustrative view of a buckle device of the related art.

Figure 1:
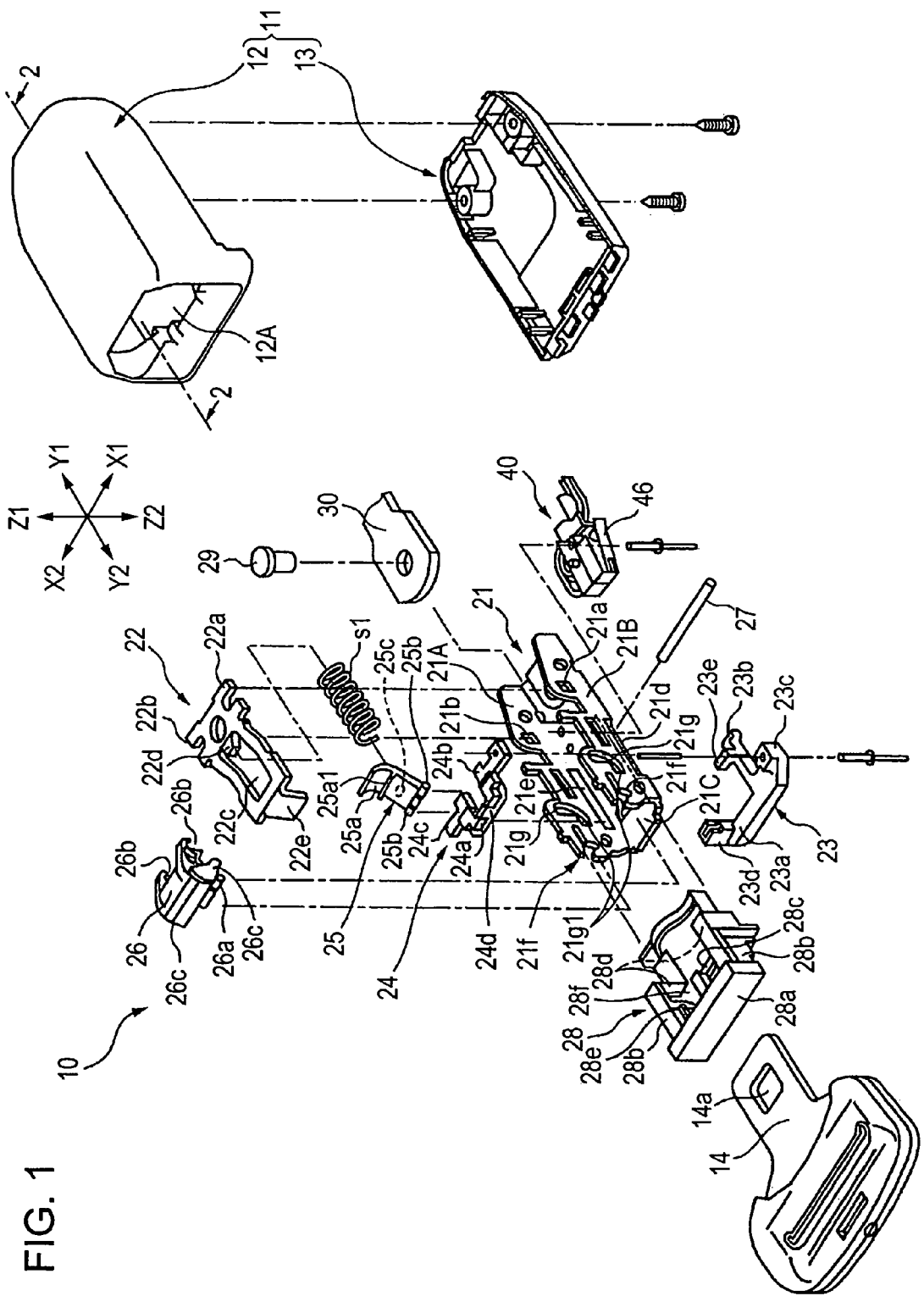
FIG. 1 is an exploded perspective view showing an embodiment of a buckle device.
Figure 2:
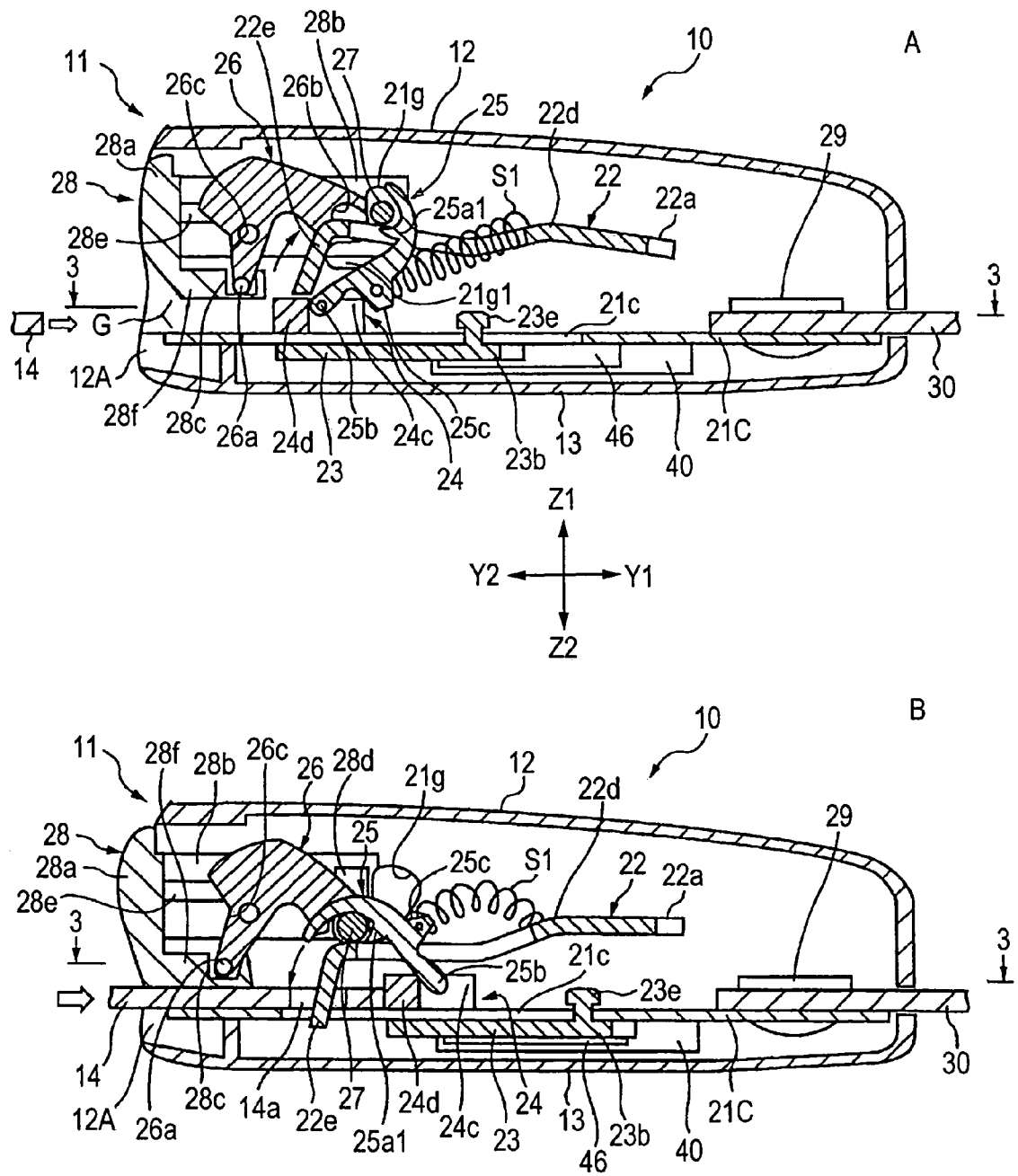
FIG. 2 shows schematic cross-sectional views, taken on line 2-2 of FIG. 1, with A showing the cross-sectional view of an initial state before a tongue plate is buckled and B showing the cross-sectional view of a latched state under which the tongue plate is buckled.
Figure 3:
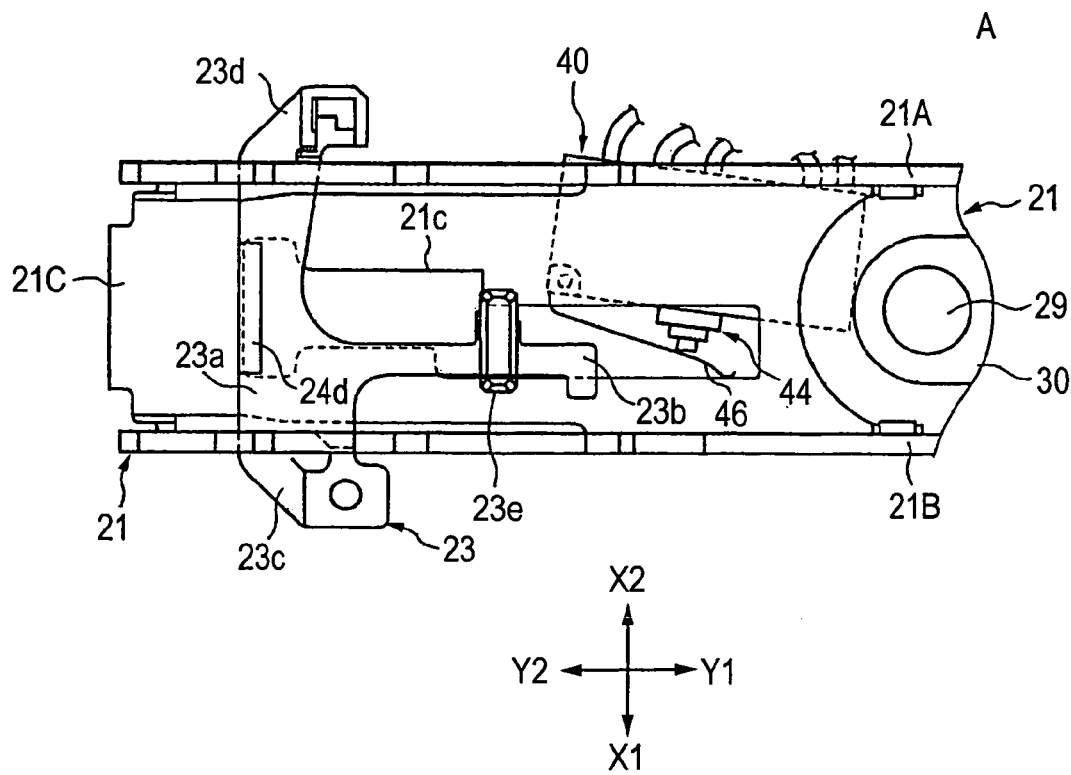
FIG. 3 shows schematic cross-sectional views, taken on lines 3-3 of FIGS. 2A, B, with A showing the cross-sectional view of the initial state and B showing the cross-sectional view of the latched state.
Figure 3:
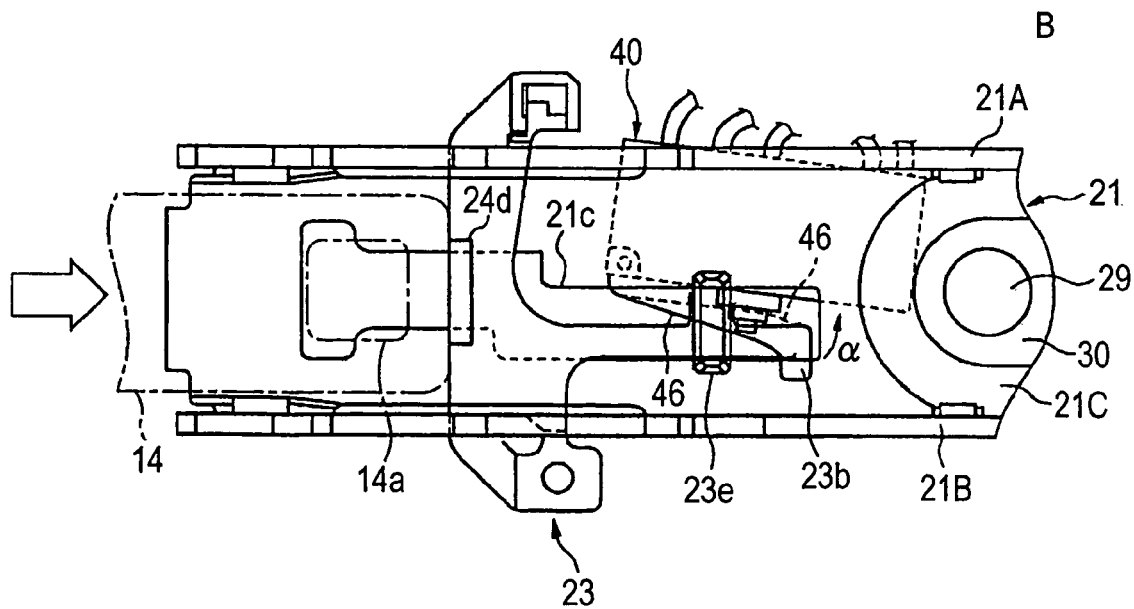
Figure 4:
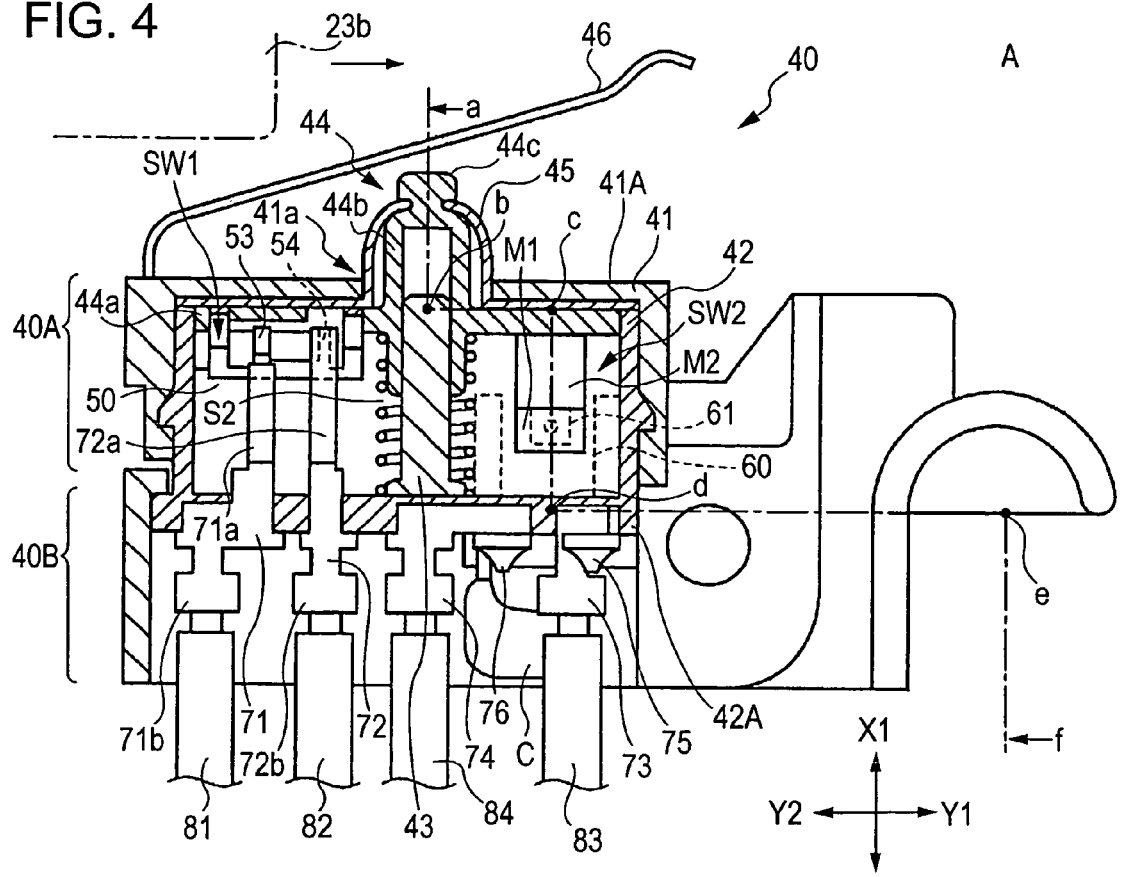
FIG. 4 shows a buckle switch mounted on the buckle device of the embodiment according to the present invention, with A showing a cross-sectional view of an initial state and B showing a cross-sectional view of a latched state.
Figure 4:
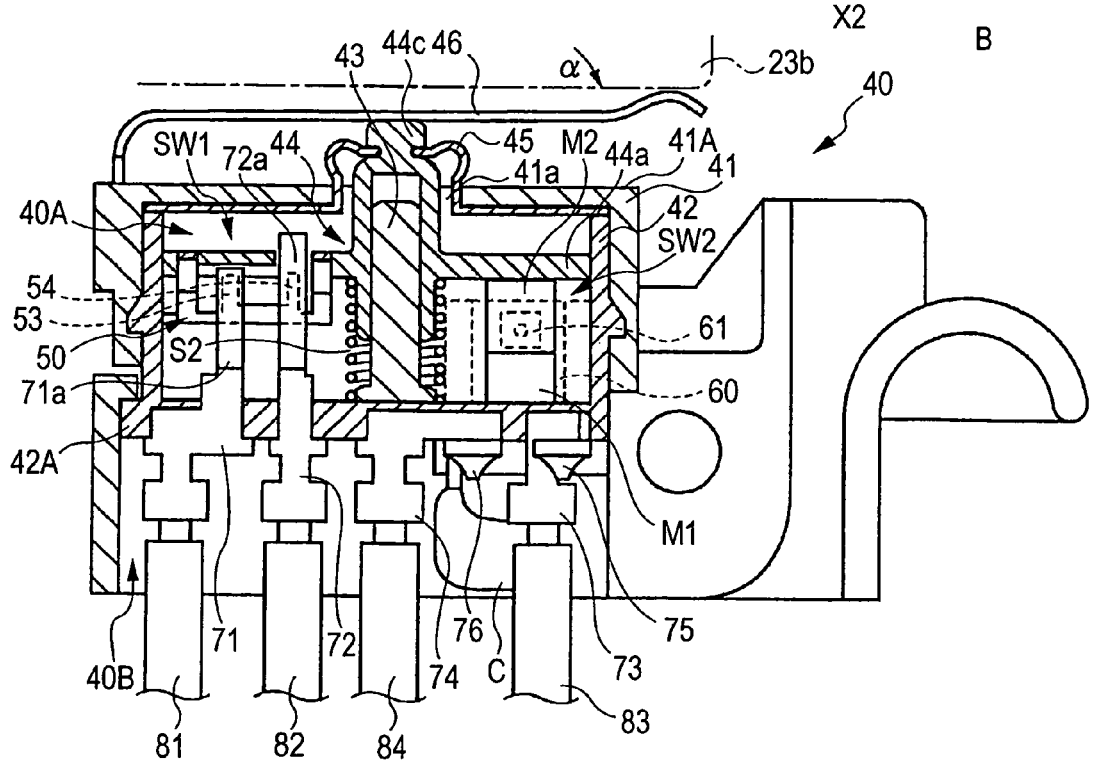
Figure 5:
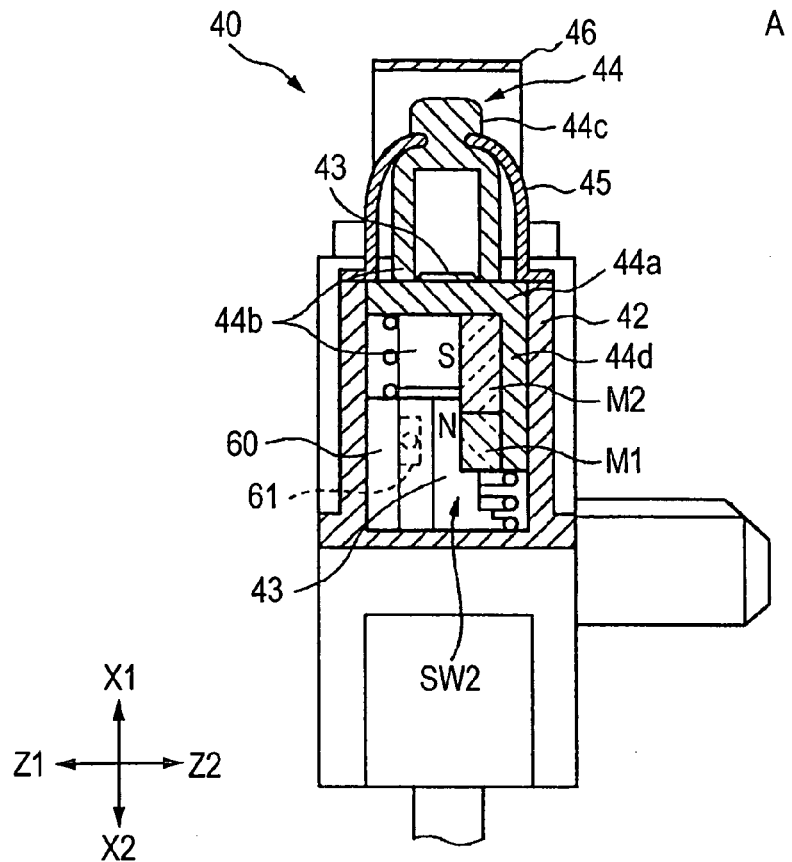
FIG. 5 shows cross-sectional views taken on line a-b-c-d-e-f of FIG. 4, with A showing an initial state and B showing a latched state.
Figure 5:
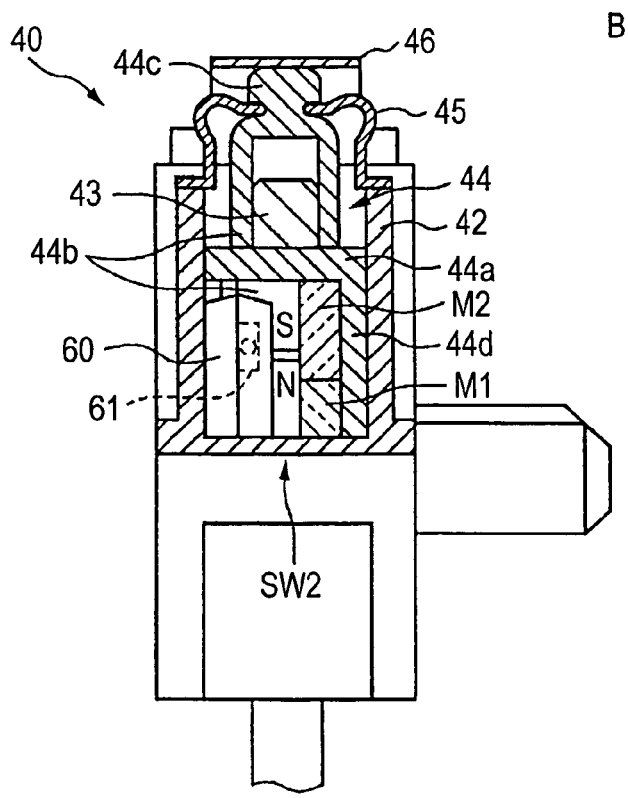
Figure 6:
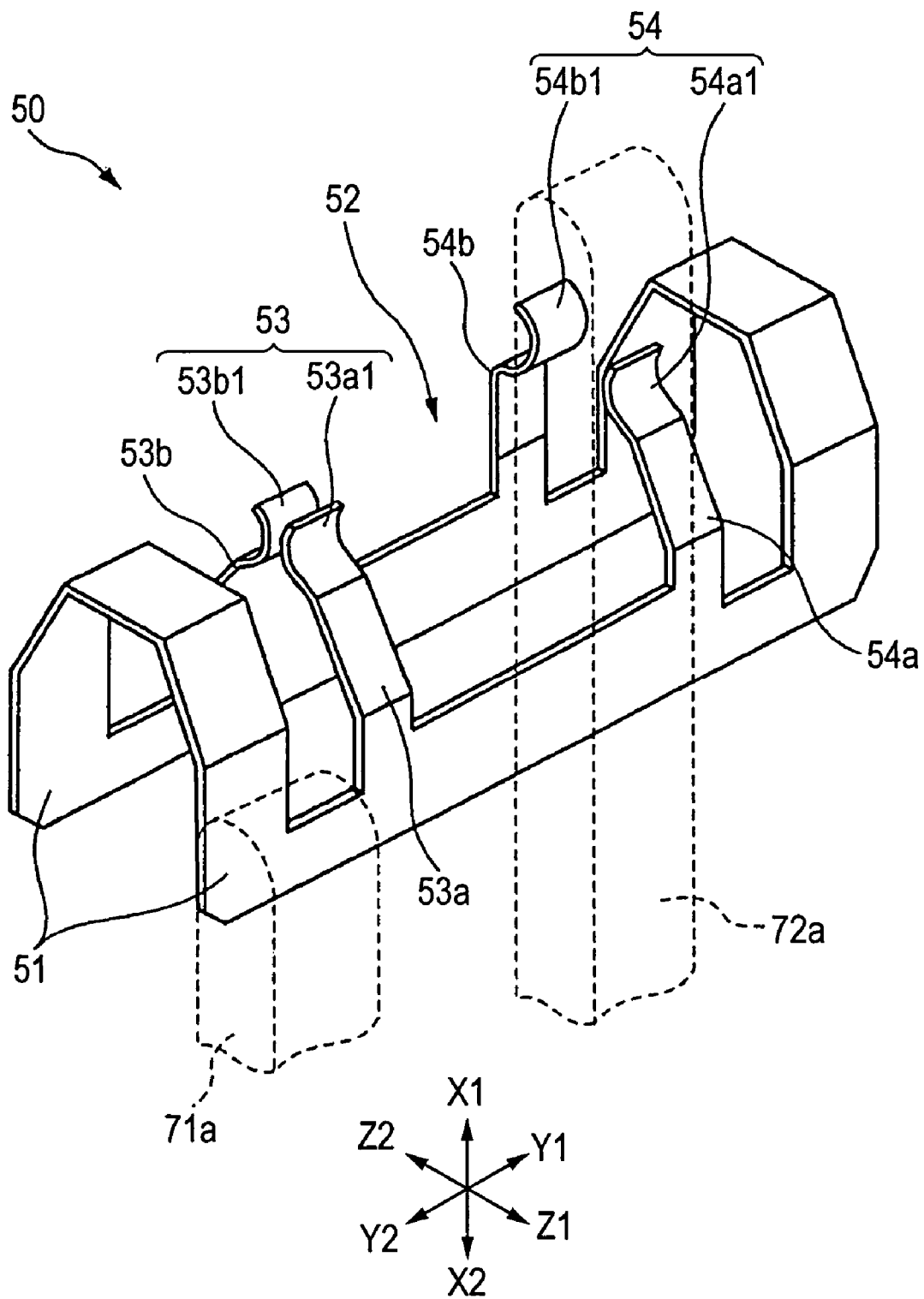
FIG. 6 is a perspective view showing a movable contact forming the embodiment according to the present invention.
Figure 7:
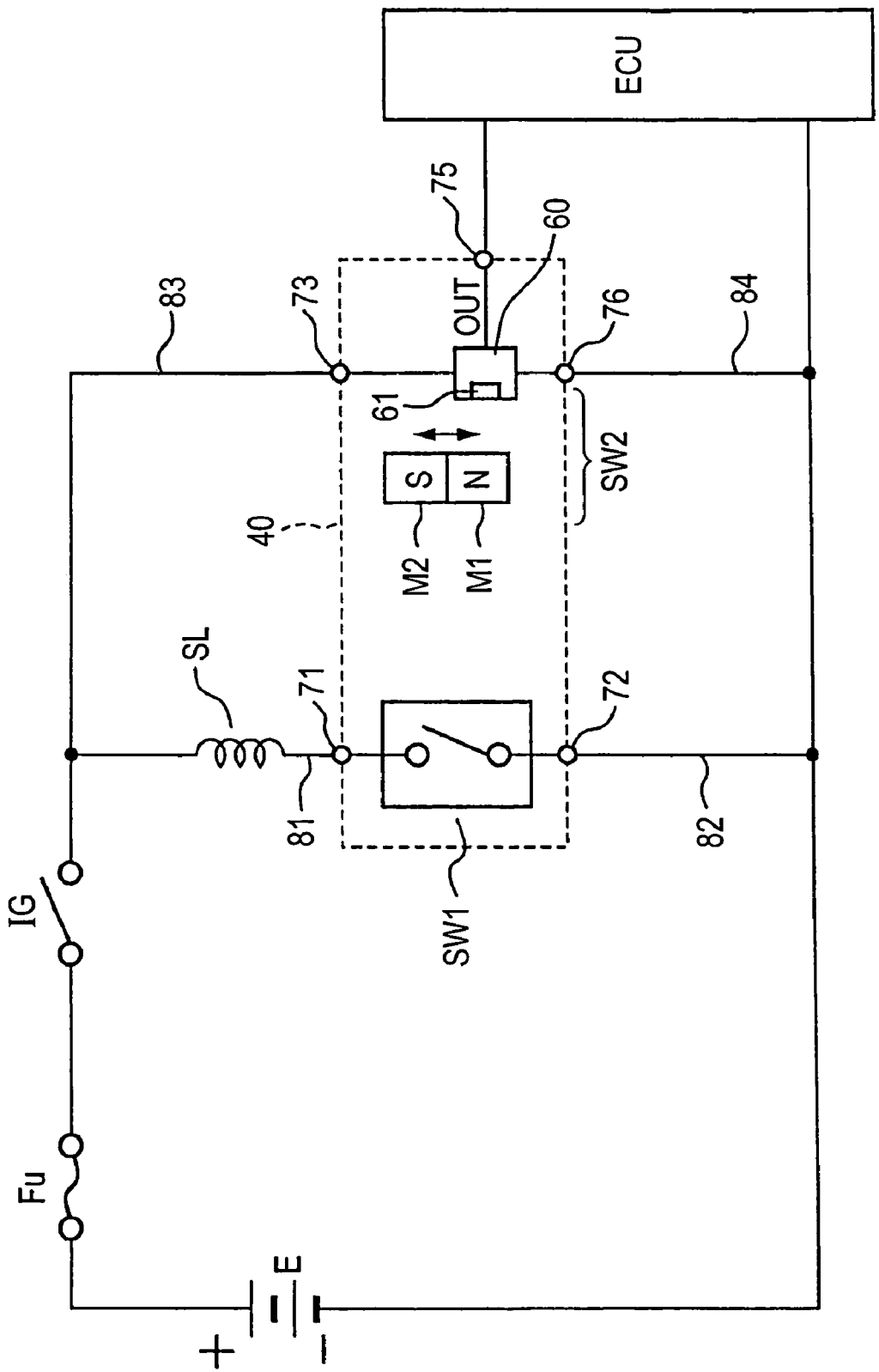
FIG. 7 is a view showing one example of a circuit with a structure employing a buckle switch mounted in the buckle device.

REFERENCE NUMERALS 10 buckle device
11 buckle body
12 upper cover
13 lower cover
14 tongue plate
21 frame
22 clutch member
23 slider
24 ejector
25 cantilever
26 stopper
27 lock bar
28 release button
30 anchor plate
40 buckle switch
41 outer case
42 inner case
43 guide shaft
44 movable member
44c depressive portion
45 waterproof member
46 leaf spring
50 movable contact
53, 54 pinch members
53b, 53b, 54a, 54b connecting segments
53a1, 53b1, 54a1, 54b1 connecting portions
71, 72, 73, 74, 75, 76 connecting terminals
71a, 72a stationary contacts
60 magnet detection means
61 magnetic detecting element (hall element)
M1, M2 magnets
S1, S2 urging members

The invention claimed is:

1. A buckle switch for detecting buckling and unbuckling states between a tongue plate, attached to a seat belt, and a buckle body to and from which the tongue plate is buckled and unbuckled, the buckle switch comprising:
a case;
a movable member freely movable within the case;
an urging member for urging the movable member in a direction to move away from the case;
a first switch section including a movable contact disposed on the movable member and a stationary contact disposed in a position opposite to the movable contact inside the case; and
a second switch section including a magnet and magnetic detection means one of which is disposed on the movable member and the other disposed in the case;
the buckle body having an inside including a slider movable with the tongue plate when the tongue plate is inserted to the buckle body,
wherein the movable member is caused to move in a direction against the urging member due to movement of the slider to render the movable contact and the stationary contact of the first switch section conductive to switch an output state of the magnetic detection means of the second switch section,
and wherein the urging member is disposed between the first switch section and the second switch section.

2. A buckle switch for detecting buckling and unbuckling states between a tongue plate, attached to a seat belt, and a buckle body to and from which the tongue plate is buckled and unbuckled, the buckle switch comprising:
a case;
a movable member freely movable within the case;
an urging member for urging the movable member in a direction to move away from the case;
a first switch section including a movable contact disposed on the movable member and a stationary contact disposed in a position opposite to the movable contact inside the case; and
a second switch section including a magnet and magnetic detection means one of which is disposed on the movable member and the other disposed in the case;
the buckle body having an inside including a slider movable with the tongue plate when the tongue plate is inserted to the buckle body,
wherein the movable member is caused to move in a direction against the urging member due to movement of the slider to render the movable contact and the stationary contact of the first switch section conductive to switch an output state of the magnetic detection means of the second switch section,
and wherein the one of the stationary contact and the movable contact includes a pair of pin-shaped terminals and the other includes pinch members between which the pin-shaped terminals are sandwiched for sliding capabilities.

3. The buckle switch according to claim 2, wherein one pin-shaped terminal and the other pin-shaped terminal are formed in different lengths in dimension and the pin-shaped terminal with a short length in dimension is operative to be brought into or out of pinching engagement with the pinch members.

4. The buckle switch according claim 2 or 3, wherein the urging member is disposed between the first switch section and the second switch section.

5. The buckle switch according to any one of claims 1 to 3, wherein the magnetic detection means internally incorporates a hall element as a magnetic detecting element.

6. A buckle device including the buckle switch according to any one of claims 1 to 3.

* * * * *